United States Patent [19]

Opprecht et al.

[11] Patent Number: 4,536,636

[45] Date of Patent: Aug. 20, 1985

[54] METHOD AND MACHINE FOR ELECTRICAL RESISTANCE ROLL SEAM WELDING WITH A SINGLE ELECTRODE-WIRE

[75] Inventors: Paul Opprecht, Herrenbergstrasse 10, CH-8962 Bergdietikon, Switzerland; Wolfgang Weil, Heitersheim, Fed. Rep. of Germany; Martin Kaul, Bellikon, Switzerland

[73] Assignee: Paul Opprecht, Bergdietikon, Switzerland

[21] Appl. No.: 573,666

[22] Filed: Jan. 25, 1984

[30] Foreign Application Priority Data

Jan. 27, 1983 [CH] Switzerland .......................... 444/83

[51] Int. Cl.³ ............................................ B23K 11/06
[52] U.S. Cl. ......................................... 219/83; 219/81
[58] Field of Search .................... 219/81, 82, 83, 84

[56] References Cited
U.S. PATENT DOCUMENTS 3,504,155  3/1970  Opprecht et al. .................... 219/81

4,258,245  3/1981  Flaherty ............................. 219/81
4,334,138  6/1982  Matsuno et al. .................. 219/83 X

*Primary Examiner*—Roy N. Envall, Jr.
*Assistant Examiner*—C. M. Sigda
*Attorney, Agent, or Firm*—William J. Daniel

[57] ABSTRACT

In a method for electrical resistance roll seam welding with a single electrode-wire, wherein the electrode-wire runs over first and second electrode carrier-rolls urged against each other, and the strength of the electrode-wire is increased by rolling-out before it enters the first electrode carrier-roll, elongations of the electrode-wire which can otherwise arise and lead to a slippage of the electrode-wire at the welding point and therefore, deleteriously affect the weld-quality can be largely prevented by reducing the electrode-wire temperature at the welding-point by cooling with a cooling device (17) the electrode-wire (12) between its rolling-out point (17/18) and its passage onto the first electrode carrier-roll (14) and/or between its departure from electrode carrier-roll (14) and its passage onto the second electrode carrier-roll (15).

21 Claims, 3 Drawing Figures

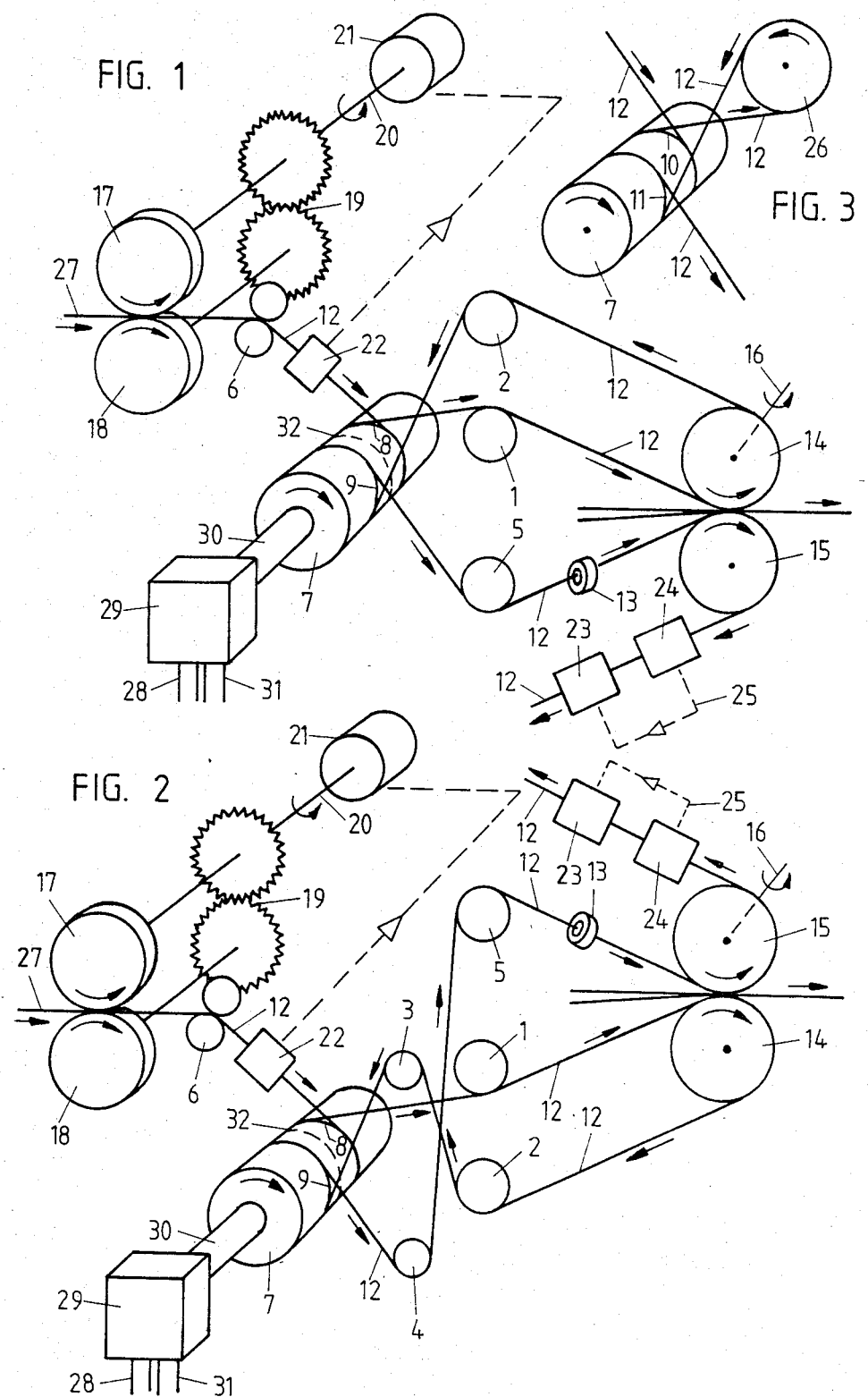

METHOD AND MACHINE FOR ELECTRICAL RESISTANCE ROLL SEAM WELDING WITH A SINGLE ELECTRODE-WIRE

The invention concerns a method for electrical resistance roll seam welding with a single electrode-wire, passing firstly over first and second electrode carrier-rolls, the two electrode carrier-rolls being urgedly against each other, the strength of the wire being increased by being rolled out before entering the first electrode carrier-roll, as well as a welding-machine for carrying out the method.

A method of this kind is known from, e.g., DE-PS 21 26 497. This was the first disclosure of continuous resistance roll seam welding with the help of only a single electrode-wire and hence laid the groundwork for high-speed automatic welding-machines working with only a single electrode-wire, thanks, in principle, to the fact that the rolling-out of the electrode-wire prior to its introduction into the first electrode carrier-roll and the increase in the strength of the electrode-wire resulting therefrom, prevented the formation of loops in the wire-loop between the first and second electrode carrier-rolls formerly caused by the rolling-out of the electrode-wire under the pressure of the first electrode carrier-roll during the practice of prior methods for resistance roll seam welding with the help of only a single electrode-wire such as, for example, known from DE-OS 15 65 803, and which made necessary the interruption of the welding-process each time after a short period of welding in order to withdraw from the wire-loop that loop formed during the period of welding.

The method according to DE-PS 21 26 497, however, requires good expert knowledge in the field of resistance roll seam welding with electrode-wires on the part of the skilled personnel executing the same as regards correct dimensioning of the pressure of the electrode carrier-rolls and of the cooling of such electrode carrier-rolls and hence of the electrode-wire, and concerning the physical properties of the electrode-wire material, particularly as regards recrystallization temperature and its dependence on amount of deformation, the temperature-dependence of its stress-strain behavior. Thus, for example, with the copper customarily used as the wire material and a temperature of, e.g., 200° C., thermal elongation alone produces a wire-elongation of approx. 0.33% at the welding-point, which, although it may, with suitable cooling of the electrode-wire after leaving the welding-point, at least largely retract or shrink again, may, however, just as easily remain or even increase if, for example, insufficient attention is paid by the operating personnel to the operating specifications for a welding-machine operating according to this method.

Such relatively slight wire-elongations do not—at least provided they do not substantially exceed a certain maximum value lying, in the light of experience, at about 2.5%—constitute an obstacle to the practice of this continuous resistance roll seam welding with a single electrode-wire, but they do prevent the obtaining of an optimal weld-quality, and the closer the relatively slight wire-elongation approaches the maximum value of approx. 2.5%. The reasons for this are that, with a relatively slight elongation occurring when passing the first electrode carrier-roll, the elongation-length is drawn away by the wire-tension required during resistance roll seam welding with electrode-wire, namely, with the first electrode carrier-roll being driven, as a rule in the direction of movement of the electrode-wire over the second electrode carrier-roll, and, with the second electrode carrier-roll being driven, as a rule against the direction of movement of the electrode-wire directly out of the first electrode carrier-roll, and that, as a result of this "drawing-away of the elongation-length", the rotary movement of that electrode carrier-roll over which the elongation-length is drawn away is overlaid by an additional rotary movement corresponding to the elongation-length. As a result, the circumferential speed of that electrode carrier-roll over which the elongation-length is drawn away changes with respect to the circumferential speed of the other electrode carrier-roll by a differential amount corresponding to the percentage elongation and hence different circumferential speeds result for the two electrode carrier-rolls. Due to this different circumferential speed for at least one of the two electrode carrier-rolls, the electrode-wire resting on that carrier roll, is played not accurately but with slippage onto the workpiece to be welded, the percentage slippage relative to the welding-speed corresponding as a rule, i.e. if it only occurs on one of the two workpiece-sides, to the percentage elongation. More specifically, this slippage occurs each time that the workpiece-surface softens slightly in the final phase of the application of a welding-spot and the wire-surface resting on the workpiece-surface can therefore, despite the pressure of the electrode carrier-roll, be displaced slightly in the direction of the welding-seam because it carries the softened workpiece-surface with it and thus, so to speak, displaces the workpiece-surface on the workpiece. These "displacements" of the workpiece-surface on the workpiece naturally have a deleterious effect on the weld-quality, and as the extent of such displacements, or the displacement-length, is proportional to the slippage, and hence proportional to the percentage elongation, this deleterious effect on the weld-quality increase with increasing wire-elongation, until, with percentage wire-elongations lying above the maximum value of approx. 2.5%, the deleterious effect exceeds acceptable limits.

In order to largely exclude the deleterious effects on the weld-quality described above and to obtain as optimal a weld-quality as possible, even relatively slight wire-elongations should therefore also be prevented as far as possible, it being in this context not only a matter of virtually completely excluding wire-elongation, or of reducing it to negligibly small amounts, when operating a welding-machine according to this method in precise accordance with the operating specifications, but also of keeping wire-elongations resulting from possible deviations from said operating specifications as small as possible and in any event substantially below the said maximum value. If, therefore, for example, with a certain electrode-wire temperature at the welding-point and a certain specified wire-tension for the electrode-wire as well as a certain specified pressure for the electrode carrier-roll on the electrode-wire at the welding-point, the working-point resulting from the wire-tension lies only slightly beneath the elastic limit in that stress-strain diagram applicable for that temperature and pressure, and if these wire-tension, pressure and temperature conditions are given at the welding-point, with the operating specifications being precisely observed, then, merely an elastic deformation of the electrode-wire results at the welding-point, whereas, within the framework of possible deviations from the operation specifications, a whole series of possibilities for exceeding the said elastic limit and wire-elongations resulting therefrom arise. For example, undesirable wire elongation can be caused by any of the following: slightly too high a pressure of the electrode carrier-rolls or slightly too little cooling of said electrode carrier-rolls, an excessive wire-tension in the electrode-wire or slightly too small a cross-section of the electrode-wire, or even some other source of trouble such as, e.g., electrode-wire material of inadequate quality or of a composition contrary to regulations, or properties at variance with nominal values, which can result in a high amount of deformation of the electrode-wire due to inaccuracies during the rolling-out of said electrode-wire and a too low recrystallization temperature of the rolled-out electrode-wire material and, finally, even a normally inconsequential such as a high ambient temperature.

The multiplicity of possible causes explained above arises in principle from the fact that work takes place close to the elastic limit and hence the various causes can lead to the plastic limit being exceeded, and, with such a host of possible causes, there are naturally considerable difficulties in ascertaining the actual cause of an occurring wire-elongation, particularly since, in some of the above-described possible causes, e.g. rolling-out, wire material purity and in particular the ambient temperature, the connection with resulting undesired wire-elongations is not immediately obvious. Because of these difficulties in pinpointing causes, the occurrence of relatively slight wire-elongations and the resulting deleterious effects on weld-quality have in many cases, at least when not too great, therefore been considered unavoidable.

The object of the invention was to find out a method and machine of the kind in question which at least most of the causes of unwanted wire-elongations could be excluded and which said method would therefore produce a welding-quality at least approaching the optimal, even in the presence, within certain limits, of deviations from the operating specifications for a welding-machine working according to the method mentioned at the beginning.

According to the invention, this is achieved by cooling the electrode-wire by passing the same through at least one cooling stage in at least one of the two areas or stretches of the path traversed by said electrode-wire between rolling-out and entering the first electrode carrier-roll and between leaving said first electrode carrier-roll and entering the second electrode carrier-roll.

Underlying the invention is the recognition that at least most of the causes of unwanted wire-elongations can be eliminated by a relatively slight increase in the elastic limit, because those deviations from the nominal operational data occurring in practice, e.g. as regards pressure and cooling of the electrode carrier-rolls and as regards wire-tension and cross-section of the electrode-wire, regularly are less than 10% and hence, by increasing the elastic limit by, e.g., 15%, the working-point still remains below the elastic limit, even in the presence of such deviations, at least provided that said deviations are not cumulative, and further that, in principle, only a single measure is needed to obtain such relatively slight increases in the elastic limit by reason of the temperature-dependency of the stress-strain diagram, i.e. reducing the electrode-wire temperature at the welding-point by a relatively slight temperature differential. By shifting the entire distribution-curve measured throughout the wire area of the electrode-wire temperature over the path travelled by the electrode-wire downwards by the temperature differential, such a reduction of the electrode-wire temperature at the welding-point can in principle be achieved that, therefore, the electrode-wire can be cooled by the temperature differential at a relatively low temperature-level such as is present in the distribution-curve outside the regions in which the electrode-wire passes over the electrode carrier-rolls, and a corresponding reduction in the electrode-wire temperature at the welding-point is thereby achieved.

The main advantage of the present method is the uncritical setting of the operational condition without at the same time sacrificing the optimal weld-quality hitherto achievable only with precise settings. Further advantages naturally also result as regards the elimination of a large part of those frequent checks, required in continuous operation with critical settings, to make sure that the said operational data agree with specified values, and of those checks required for readjustments in the presence of deviations from said values, and as regards the elimination of those deteriorations in weld-quality which have to be tolerated if the checks and readjustments are omitted during continuous operation with critical settings. Furthermore, greater variation is possible in the materials used such as, e.g., the possibility of using sheet-metal with bigger sheet-thickness tolerances for welding or the possibility of using copper-wires with various degrees of purity of the copper as the electrode-wire.

With the present method, the electrode-wire can, to particular advantage, run, in at least one of said two areas, over a cooling-drum acting as said cooling-device, said cooling-drum being traversed by a cooling-means, preferably water, serving to remove heat, the wire being preferably led through guide-grooves in order to avoid lateral movement in the direction of the drum-axis. The advantage of using a cooling-drum as the cooling-device is the intensive cooling achievable thereby with relatively slight space-requirements. It is, however, also possible, for example, and may be of advantage as regards technical resources, to employ as the cooling-device a simple fan with a flow-nozzle directed at the electrode-wire.

In order to to avoid lateral movement in guide-grooves the electrode-wire can, with the present method, advantageously, after rolling-out, be calibrated laterally at its narrow sides, which result from rolling-out, to at least approximately the width of the narrowest of said guide-grooves to be traversed, by means of a rolling-roll pair being provided with a calibrating-groove in at least one of such rolling-rolls. Such a calibration also has a series of further advantages, in addition to providing for good guidance of the electrode-wire in guide-grooves having a width corresponding to the calibration-width, the most important being the prevention of excessive electrode temperatures at the welding-point which can arise as a result of lateral movements of the electrode-wire in the guide-grooves on the electrode carrier-rolls and insufficient contact-surfaces between the electrode-wire and the workpiece at the welding-point caused thereby and the consequential increased contact-resistances between the electrode-wire and the workpiece Furthermore, calibration in this way levels any slight concave surface-curvatures on the flat sides of the rolled-out electrode-wire still present after rolling-out, and prevents excessive contact-resistances between the electrode-wire and the workpiece and excessive electrode-temperatures at the welding-point resulting therefrom. The calibration of the width of the rolled-out electrode-wire must therefore be primarily matched to the width of the guide-grooves in the electrode carrier-rolls and, secondarily, to the width of any other guide-grooves to be traversed by the electrode-wire such as the guide-grooves in the cooling-drum mentioned earlier, which other guide grooves should be similar in width to those on the carrier roll, to obtain good guidance of the electrode-wire in these other guide-grooves as well and to avoid lateral movements of the electrode-wire therein. It should be remarked in this connection, however, that such a matching of the width of other guide-grooves such as, e.g., guide-grooves on the cooling-drum, to the width of the guide-grooves on the first electrode carrier-roll should only be taken into consideration if the electrode-wire runs exactly at right-angles to the axis of the roll or drum bearing the guide-groove, both when it enters the said guide-groove and when it leaves it. However, if the electrode-wire does not enter and leaves the guide-groove at exact right-angles to the drum axis, a greater width of guide-groove with respect to the wire-width is required so that the wire can also maintain its position inclined with respect to such axis within the guide-groove. Conversely, a result of the above is, further, that, when calibrating the wire-width to the width of the guide-grooves of the electrode carrier-rolls, entry of the electrode-wire into and its exit from the guide-grooves on the electrode carrier-rolls should take place at right-angles to the roll axis, or, if this not feasible, the guide-groove in that electrode carrier-roll should be made so much wider that the wire is able to maintain its position inclined with respect to the axis in the guide-groove.

When using a cooling-drum as the cooling-device, the electrode-wire can, with the present method, advantageously be led over the cooling-drum in such a manner that said electrode-wire rests on said cooling-drum over an arc of a total of at least 180°, preferably more than 250°. Such a large contact-arc has, with a given cooling-capacity or a given volume of water-flow per unit of time, the advantage of a better cooling of the electrode-wire or, for a given amount of cooling of the electrode-wire being given, the advantage of a lower requisite cooling capacity. Contact-arcs of up to a maximum of approx. 330° can be achieved with the wire looped round the drum in this manner, although, in that case any guide-groove should be at least twice as wide as the wire-width. If the requisite cooling of the electrode-wire cannot be obtained with even such a maximum contact-arc, several loops round the drum can in principle be tried. Here, the said electrode-wire is advantageously led, in at least one of the two regions of its path, over the cooling-drum and over a generally parallel guide-roll being arranged near said cooling-drum and which is preferably of at least approximately the same diameter as said cooling-drum, in such a manner that said electrode-wire runs successively over a first and a second guide-groove of said cooling-drum and hence, in between, over said guide-roll in a direction such that said guide-roll rotates in the opposite direction to the direction of rotation of said cooling-drum.

With the present method, the electrode-wire can advantageously be cooled, in at least one of the two regions, to a temperature not more than 25° C., preferably not more than 15°, above ambient temperature. Relatively still-large temperature differences in the order of 10° through 30° C. thereby remain between the electrode-wire temperature and the customary cooling-water temperatures, lying as a rule below 15° C., so that the advantage of a relatively small consumption of cooling-water results. If it is desired to reduce even further the temperature-differential above ambient to, e.g., approx. 5° C., multiple looping round the cooling-drum is recommended.

In an advantageous further development of the present method, in order to reduce heating-up of the wire secondary current to the welding-current flowing in said electrode-wire in the region between said first and said second electrode carrier-rolls, the electrode-wire is led, in that region through a preferably tube-shaped annular core made of a highly permeable material to induce a countervoltage being in said electrode-wire, which reduces the secondary current. This measure enables the secondary current, and hence the additional heating-up of the wire produced thereby, to be almost completely suppressed. Use of this measure is of particular advantage if the electrode-wire temperature is to be reduced to a value lying only just a little over the cooling-water temperature and the secondary current would otherwise prevent a further reduction of the electrode-wire temperature.

In a preferred embodiment of the present method, the electrode-wire is cooled in both of the above two regions contact with a common cooling-device, this being accompanied by the advantage of a considerable reduction in the technical resources devoted to cooling the electrode-wire. It can then be of considerable advantage, particularly if heating-up of the wire by the said secondary current has disturbing effects, to avoid an electrical parallel-circuiting of electrode-wire sections lying between said cooling-drum and said first electrode carrier-roll within both the two areas, to avoid an increasing said heating-up of wire effected thereby in the two areas by the secondary current as a result of electrical resistance-reduction and of current-increase of said secondary current to said welding-current flowing in said electrode-wire by substantially electrically insulating from one another the parts of the cooling-drum contacted by the wire. Instead of this measure, or possibly in addition to it, in that part of the wire path stretch lying between the cooling-drum and said second electrode carrier-roll, the electrode-wire can also be advantageously led through the annular core, mentioned earlier, since by the latter measure, with suitable dimensioning of the said annular core, the secondary current can be virtually almost completely suppressed, and the former measure, i.e. the avoidance of parallel-circuiting by means of a cooling-drum consisting of two parts insulated from each other, becomes, naturally, superfluous. In this connection the term "annular core" is meant here in the magnetic sense, i.e. in the sense of ferromagnetic material essentially surrounding the said wire, and not in a structural sense.

It is further of advantage with the present method for the wire to pass beforehand, preferably before entering the cooling-device, in order to obtain sufficient wire-tension, through a device restraining said traversing wire, which is preferably designed as a wire-brake. Here, the device provided for rolling out the said electrode-wire can, with suitable regulation of the rolling-speed of said rolling-out device by means of the deviation of the measured wire-tension from a given tension-value as system deviation, can also be advantageously employed for wire tensioning, it being then possible to do without a separate wire-brake. On the otherhand, the use of a separate wire-brake has the advantage that the wire-tension at the exit from the rolling-out device is not determined by the given tension-value but can in principle be freely selected, this being requisite in many cases for good functioning of the rolling-out device.

The invention further concerns an electric welding-machine for resistance roll seam welding with a single electrode-wire, said electrode-wire passing firstly over a first and then over a second of two electrode carrier-rolls being urged against each other, said welding-machine having means for rolling out said electrode wire before it reaches said first electrode-roll to thereby roll out the wire and offset increase in its strength characterized by at least one cooling-device for cooling said electrode-wire in at least one of the two wire-guiding regions between the rolling-out means and the said first electrode carrier-roll and between the said first and the said second electrode carrier-rolls.

The welding-machine can advantageously comprise the following a cooling-drum acting as a cooling-device for cooling the electrode-wire in at least one of the said two wire-guiding regions, said cooling-drum being preferably provided with guide-grooves, a rolling-roll pair in the wire-guiding area between the rolling-out means and the first electrode carrier-roll, said rolling-roll pair being provided with a calibrating-groove in at least one of its two rolling-rolls; means for guiding the wire in such a manner that the electrode-wire rests on the cooling-drum over an arc of a total of at least 180°, preferably more than 250°, and, further, a preferably tube-shaped annular core made of a highly permeable material and enclosing the electrode-wire in the wire-guiding area between the first and second electrode carrier-rolls other features can include as well as a guide-roll arranged near the cooling-drum with its axis generally parallel to the axis of said cooling-drum and preferably of at least approximately the same diameter as said cooling-drum, the guide-roll rotating in an opposite direction to the direction of rotation of said cooling-drum.

A preferred embodiment of the present welding-machine has a cooling-device serving for cooling the said electrode-wire in both the wire-guiding regions, said cooling-device being preferably a cooling-drum. The cooling-drum can advantageously have the several drum-parts contacted by the wire substantially electrically insulated from one another, such If the welding-machine is provided with the annular core, it should, preferably surround the electrode-wire between the cooling-device and the second electrode carrier-roll.

It is particularly advantageous is, further, an embodiment of for the drive for the second electrode carrier-roll and the means restraining the said electrode-wire to produce a wire-tension in the region of the wire path ahead of the first electrode carrier-roll and preferably ahead of the cooling-device.

By means of the following figures, the invention is in the following explained in more detail by reference to illustrative embodiments.

FIG. 1 is a diagram of the basic structure of a device for carrying out the present method with cooling of the electrode-wire ahead of the first, and also between the first and second, electrode carrier-rolls, and with the first electrode carrier-roll being driven, FIG. 2 is a diagram of the basic structure of a device for carrying out the present method with cooling of the electrode-wire ahead of the first, and also between the first and second, electrode carrier-rolls, and with the second electrode carrier-roll being driven, FIG. 3 is a detailed diagram of a preferred guidance arrangement of the electrode-wire for multiple looping round a common cooling-drum.

It should be pointed out in advance that the schematic diagrams shown in FIGS. 1 and 2 show only those structural parts of welding-machines involved in carrying out the present method and consistent with clear graphical representation, and that even those parts shown are depicted in largely symbolized form. Thus, for example, the rolls 1 through 5 shown in FIGS. 1 and 2 serve exclusively to provide a clear graphical representation and therefore do not need to be present in an actual welding-machine. Likewise, the cooling-drum 7 in FIGS. 1 through 3 is depicted with considerable length only for reasons of clarity so that the two guide-grooves 8 and 9, and 10 and 11, respectively, thereon, and the wire-guidance of the electrode-wire 12 in the two guide-grooves may be clearly distinguished; in practice, however, the cooling-drum generally has, of course, a considerably shorter length, usually less than half of its diameter, and the guide-grooves lie relatively close together. The annular core 13 shown in FIGS. 1 and 2 is also shown in symbolic form and could, in practice, be formed by, for example, a guide-roll made of highly permeable ferrite core material over which the electrode-wire is led, said guide-roll running in a casing forming the magnetic ring-closure, said casing being made of the same ferrite core material. Also indicated only symbolically are, the rotating drive shaft 16 for driving the electrode carrier-roll 14, 15 in FIGS. 1 and 2, the crushing-unit provided for rolling-out the electrode-wire 12, including the two crush-rolls 17 and 18 as well as the reversing-gear 19, and the drive installation 21 comprising a drive motor and means for controlling the rotational speed of the shaft 20, the wire-tensioning unit 22 provided for obtaining a predetermined wire-tension of electrode-wire 12 (the wire-tensioning unit in practice as a rule comprises a force-loaded deflector-roll for said electrode-wire and means for measuring the wire-length between said deflector-roll and said crush-rolls 17 and 18, or for measuring the distance between the actual position of said deflector-roll and a given set-point position of said deflector-roll corresponding to a certain wire-length between said deflector-roll and said crush-rolls, as well as means for transferring the system deviation formed by the measured distance between the actual and said set-point positions of the deflector-roll to a control-means for the drive unit 21 for such an adjustment of the rotational speed of shaft 20 and hence of crush-rolls 17 and 18 that the wire-lengths between said crush-rolls and said deflector-roll remains essentially constant and that the system deviation becomes zero). Also seen in symbolic form is the wire-feed installation 23 provided at the output side for drawing electrode-wire 12 from said second electrode carrier-roll 15 and for passing on the electrode-wire into a wire-chopper, including means for step-by-step or continuously adjusting the conveying-speed and the wire tensioning drive 24. This wire-feed installation 23 can be formed by, e.g., a stepped pulley, driven at a constant rotational speed, having a number of ring-shaped guide-surfaces for the electrode-wire, said ring-shaped guide-surfaces constituting finely graded steps in their diameters, or combined accordance with the said drive installation 21 to be as a conveying-disk on the shaft 20. The wire-tensioning device 24 at the output side of wire feed installation 23 and the initial wire-tensioning unit 22 can be so controlled that the conveying-speed of said wire-feed installation 23 is so adjusted that a predetermined constant wire-tension is maintained during drawing the electrode-wire 12 from second electrode carrier-roll 15. Alternatively, where the wire-feed installation 23 includes a driven stepped pulley, tensioning device 24 can be formed, e.g., by a spring-loaded roll traversed by electrode-wire 12 and tensioning the wire, to an indicated spring value arrived at by adjusting of the conveying-speed of wire-feed installation 23 by hand. Alternatively the spring-loaded roll can interact with the said stepped pulley forming a wire-feed 23 such that, upon lessening of said spring-tension of the spring-loaded roll, the electrode-wire automatically changes over onto that ring-shaped guide-surface corresponding to the next-higher conveying-speed stage and, upon increasing spring-tension of the spring-loaded roll, automatically changes over onto that ring-shaped guide-surface corresponding to the next-lower conveying-speed stage. All these components are already known from prior art welding-machines used for carrying out the method according to DE-PS 21 26 497 above and therefore require no further elucidation.

In carrying out the present method with the welding-machine according to FIG. 1 or FIG. 2, the electrode-wire, after being drawn from a non-shown wire-supply or-wire store, enters the welding-machine at 27. At this point, electrode-wire still being circular in crosssection, and first passes through the or rolling roll pair formed by the crush-rolls 17 and 18 and is there rolled out into a flattened form having two approximately parallel flat sides and two rounded narrow sides. During rolling out, the wire crosssection of said electrode-wire is reduced to approximately 80% to 90% of the original wire crosssection and the wire length is correspondingly elongated by approx. 20% to 10%, while the wire temperature heats up from the temperature prevailing in the wire-supply, generally corresponding to the ambient temperature, to appox. 60° C. to 70° C. because of the deformation work carried out upon it.

With the known method, the electrode-wire was, after passing the crush-roll pair, advanced, without any particular cooling-measures (and accordingly at the elevated wire-temperature of, e.g., 60° C. to 70° C. minus a slight incidental cooling of, e.g., 5° C.) along the pathway from the crushing unit directly to the first electrode carrier-roll and cooled there, on the cooled electrode to reduce its temperature by approx. 10° C. so that it reached the welding-point with a temperature of 45° C. to 55° C. and was then heated up to, for example, approximately 210° C. by the heating effect of the welding-current flowing through it and by heat-transfer from the welding-point.

With the present method, electrode-wire 12 is now, after leaving the said crush-roll pair 17/18, first led through a secondary rolling-roll pair 6 provided for calibrating and is there calibrated in its width to the width of the non-shown guide-grooves provided in the said electrode carrier-rolls 14 and 15. During said calibrating, the electrode-wire 12 receives an approximately right-angled cross-sectional form, essentially the two narrow sides of the rolled-out electrode-wire 12 being flattened and the still slightly convexly curved flat sides thereof being levelled and undergoes a slight increase in the wire-temperature by about 5° C. because of the additional deformation work associated herewith.

Next, the electrode-wire 12 traverses the wire-tensioning-unit 22, by which tensioning-unit a predetermined wire-tension is, in known manner, produced and maintained in the electrode-wire in interaction with the crushing-unit formed by the crush-rolls 17 and 18, the reversing-gear 19 and the drive installation 21. In this process, the crushing-unit acts as the element restraining the said wire, and the wire-tension is in principle produced by a kind of spring-loaded deflector-roll for the electrode-wire, the rolling-speed of the crushing-unit being so adjusted by the changeable position of said deflector-roll that the wire-length between the crush-roll pair and said deflecting-roll remains essentially constant. From the wire-tensioning unit 22 the electrode-wire 12 is then led to the said cooling-drum 7 and reaches the cooling-drum with a wire-temperature of approx. 62° C. to 72° C., the changes from the output temperature at the crush-roll pair arising from the heating-up in the calibrating rolling-roll pair 6 minus cooling on the pathway from said crush-roll pair 17/18 to said cooling-drum 7. On cooling-drum 7, the electrode-wire 12 is introduced in the guide-groove 8 and leaves said guide-groove again after somewhat less than one loop round cooling-drum 7. The loop-arc here amounts to approx. 300°. Cooling-water at a water-temperature of approx. 12° C. is led to the cooling-drum 7 through the water supply-pipe 28, the drum bearing-box 29 and the sealed hollow shaft 30 mounted in drum bearing-box 29 and rotating with cooling-drum 7, said cooling-water flowing along the inside-wall of the hollow cooling-drum and cooling said cooling-drum down to approx. 12.5° C. to 13.5° C., leaving the drum via a fixed pipe arranged inside the hollow shaft 30 and discharging into a separate discharge-chamber in said drum bearing-box, and then leaving the separate discharge-chamber at an output temperature of approx. 13° C. through the water-drain 31. The cooling-water flow through cooling-drum 7 is so dimensioned that the electrode-wire 12 is cooled, during its contact with cooling-drum 7 or with its guide-groove 8, to approx. 20° C. to 25° C. If it is desired to obtain the same effect with a smaller cooling-water flow, it is recommendable to cause said electrode-wire 12 to pass round said cooling-drum 7 several times, as shown in principle in FIG. 3. In FIG. 3, the electrode-wire 12 is first led into the guide-groove 10 and leaves said groove again after somewhat less than one loop round said cooling-drum 7 and is then led over the guide-roll 26 in the manner shown in FIG. 3 and, after having left said guide-roll, is led into the guide-groove 11 on the cooling-drum 7, leaving said guide-groove 11 in turn after somewhat less than one loop round said cooling-drum 7. In this manner, in the example shown in FIG. 3, total loop-arcs of up to approx. 630° can be obtained, but this form of multiple looping can, however, of course be repeated by means of further guide-rolls and guide-grooves as often as desired, so that, consequently, the total loop-arc with such multiple looping is, in principle, not limited. From a practical point of view, however, a limitation does exist in that, each time the wire is led onto a roll or drum, said wire is bent over the radius of said roll or drum and is bent back again upon leaving said roll or drum, and if this back-and-forth bending is repeated too often the danger of wire-breakage increases substantially. After leaving the cooling-drum, electrode-wire 12 is then led, at a wire-temperature of approx. 20° C. to 25° C., to the first electrode carrier-roll 14. If, as in FIG. 2, first electrode carrier-roll 14 is the non-driven electrode carrier-roll, it is recommendable to lead the said electrode-wire into the guide-groove of the electrode carrier-roll in such a manner, similarly as shown in FIG. 2, that, before reaching the welding-point, said electrode-wire rests on the bottom of the said guide-groove either not at all or only very lightly, because then any wire-elongations occurring at the welding-point will be drawn out of the welding-point backwards by the wire-tensioning without any backward-movement being at the same time also transferred to the electrode carrier-roll, with the result that, in this manner, exactly the same circumferential speeds for both electrode carrier-rolls can be obtained without difficulty. The present method is particularly suited for this possibility because electrode-wire 12 in any case enters the first electrode carrier-roll at a very low wire-temperature and the customary entry-point into the guide-groove of the electrode carrier-roll, lying approximately 90° ahead of the welding-point, can be moved closer to the weld point. As already mentioned, a cooling of the wire until it reaches the welding-point still takes place, but because of its lower starting-temperature, the electrode-wire 12 entering the first electrode carrier-roll at a wire-temperature of approximately 20° C. to 25° C. only heats up to approx. 180° C. to 185° C. and hence only reaches a final temperature at the welding-point approx. 25° C. to 30° C. lower than with the known method mentioned earlier, and this results, for the reasons elucidated earlier, in a substantial increase in operational reliability and a considerably less critical setting of the operating data.

After passing the welding-point, the electrode-wire 12 still remains in the guide-groove of the electrode carrier-roll 14 over an arc of approx. 180° and is cooled down in the said guide-groove, by the cooling of said electrode carrier-roll 14, to approx. 55° C. by the time it leaves said carrier-roll and hence to a temperature lying approx. 15° C. to 20° C. below the corresponding wire-temperature in the known method.

From the electrode carrier-roll 14 the electrode-wire 12 is then led again to the cooling-drum 7 and introduced into the guide-groove 9 on said cooling-drum, leaving said guide-groove again after somewhat less than one loop round said cooling-drum 7. Here, the loop-arc is again approx. 300°, and the electrode-wire entering said cooling-drum 7 at a wire-temperature of approx. 55° C. is there cooled by approx. 25° C. to approx. 30° C. In this case, the cooling is smaller than beforehand when traversing the guide-groove 8 because in this cooling-case a current-heating is overlaid which is caused by the secondary current to the welding-current flowing through the electrode-wire 12 or its stretch between the first and second electrode carrier-rolls 14 and 15. To prevent said secondary current and hence the current-heating of the wire caused thereby from becoming to great, the cooling-drum 7 is subdivided into two parts at the place 32 marked by a dashed line, said two parts being electrically insulated from each other, so that the wire stretch between the electrode carrier-roll 14 and the guide-groove 8 is not circuited in parallel with that wire stretch between the electrode carrier-roll 14 and the guide-groove 9, which would result in a resistance-reduction and hence an increase in the said secondary current and in the current-heating caused thereby. Instead of such a subdivision of the cooling-drum 7 into two parts electrically insulated from each other, or in addition thereto, the indicated annular core 13 can also be inserted in the wire-section between the guide-groove 9 and the second electrode carrier-roll 15, by means of which annular core an electrical countervoltage is generated in the said wire-section, said countervoltage being capable, with a suitable dimensioning of said annular core 13, of suppressing the said secondary current and hence naturally also the current-heating caused thereby almost completely without seperate cooling-drum parts. In practice annular core 13 was, however, dispensed with because the reduction of the temperature of electrode-wire 12 in the guide-groove 9 was sufficient. In addition, a second looping round the cooling-drum 7 would be cheaper than the annular core 13.

After leaving the guide-groove 9 of the cooling-drum 7, electrode-wire 12 is then led to the second electrode carrier-roll 15 and is there heated at the welding-point to approx. 190° C. and hence to a temperature lying approx. 45° C. lower than the corresponding wire-temperature with the above known method.

After leaving the second electrode carrier-roll 15, the electrode-wire 12 then runs, in customary fashion, over the wire-tensioning device 24 and the wire-feed installation 23, whose structure and function has already been explained earlier, and is then led to a wire-chopper which is not shown.

I claim:

1. In a method of electrical resistance roll seam welding with a single electrode wire comprising the steps of passing said wire through a rolling out stage to roll out the same and thereby increase its strength, and passing the rolled-out electrode wire in a given path over a first and then over a second electrode carrier roll while said first and second carrier rolls are urged against one another, the improvement comprising the step of positively cooling said electrode wire in at least one of a) a stretch of said wire path between said rolling-out stage and said first carrier roll or b) a stretch of said path between the first and second carrier rolls, by passing the wire in each such stretch through a cooling station to reduce the wire temperature a sufficient amount to increase its elastic limit above its elongation point under substantially a given set of welding conditions.

2. A method according to claim 1, wherein said cooling station comprises a cooling-drum (7) traversed by a cooling-means serving to remove heat therefrom, said drum having at least one peripheral guide-groove (8, 9; 10, 11) in order to avoid lateral movement of said wire in the direction of the drum-axis.

3. A method according to claim 2, including the step of passing said wire after said rolling-out step through a calibrating station to calibrate the same laterally at its narrow sides resulting from said rolling-out step, to at least approximately the width of the narrowest of said guide-grooves.

4. A method according to claim 2, wherein said electrode-wire (12) is led over the said cooling-drum (7) in such a manner that said electrode-wire rests on said cooling-drum (7) over an arc of a total of at least 180°.

5. A method according to claim 2, wherein said electrode-wire (12) is led, in at least one of said two stretches, over the said cooling-drum (7) and over a guide-roll (26) arranged near said cooling-drum on an axis at least approximately parallel to the axis of said cooling-drum, in such a manner that said electrode-wire (12) runs successively over a first drum groove (10), then over guide roll (26) and thereafter over a second guide-groove (11) of said cooling drum (7) with said guide-roll rotating in an opposite direction to the direction of rotation of said cooling-drum (7).

6. A method according to claim 1, wherein said electrode-wire (12) is cooled, in at least one of the said stretches, to a temperature not more than 25° C. above ambient temperature.

7. A method according to claim 1, including the step of passing said electrode wire through an annular core (13) of a highly permeable material, to thereby induce a countervoltage in said electrode-wire (12), said countervoltage reducing any secondary current to said welding current in said wire and resultant heating of the wire.

8. A method according to claim 1, wherein said electrode-wire (12) is cooled in both of said two stretches by a common cooling station (7).

9. A method according to claim 5, wherein said grooves are in separate axial sections of said drum electrically insulated from one another to avoid an electrical parallel-circuiting of electrode-wire sections lying between said cooling-drum (7) and said first electrode carrier-roll (14) within both the said two stretches, and to avoid an increasing of said heating-up of said wire in the same two stretches by a secondary current.

10. A method according to claim 7, wherein in said stretch between said first (14) and said second (15) electrode carrier-rolls lying between said cooling-device (7) and said second electrode carrier-roll (15), said electrode-wire (12) is passed through said annular core (13).

11. A method according to claim 1, wherein said second electrode carrier-roll is driven and the first carrier roll (14) is non-driven and said electrode-wire (12) is passed between said two stretches over the non-driven carrier-roll (14), and including the step of passing said wire, before entering said cooling station (7), through a wire-tension station (17/18).

12. In an electric welding-machine for resistance roll seam welding with a single electrode-wire (12), comprising first and second electrode carrier-rolls (14, 15) over which rolls said electrode wire (12) passes in turn while moving along a given path, means for pressing said carrier rolls against each other, and means (17, 18, 19, 20, 21) for rolling out said electrode wire (12) before said wire reaches said first electrode-roll (14) to effect an increase in the strength of said electrode-wire (12), the improvement comprising at least one cooling-device (7) for cooling said electrode-wire (12) in at least one of a) stretch of said electrode wire path between the said rolling-out means (17, 18) and said first electrode carrier-roll and b) the stretch between said first and said second electrode carrier-rolls.

13. A welding-machine according to claim 12, wherein said cooling device comprises at least one cooling-drum (7), said cooling-drum being provided with at least one wire guide-groove (8, 9; 10, 11) on its periphery.

14. A welding-machine according to claim 12, further comprising calibrating roll means (6) on the wire path between said rolling-out means (17, 18) and said first electrode carrier-roll (14), said calibrating roll means being provided with a calibrating groove for calibrating the transverse dimension of said wire.

15. A welding-machine according to claim 13, incuding means for guiding the wire in such a manner that it is in contact with said cooling-drum (7) over an arc of a total of at least 180°.

16. A welding-machine according to claim 15, wherein said cooling drum includes two guide-grooves (10) and (11) thereon and said guiding means comprises at least one guide-roll (26) arranged near the said cooling-drum (7) on an axis at least approximately parallel to the axis of said cooling-drum, whereby said electrode-wire (12) runs successively over said first groove, around said guide roll and then over said second guide-groove of said cooling-drum (7) with said guide-roll rotating in an opposite direction to the direction of rotation of said cooling-drum (7).

17. A welding-machine according to claim 12, characterized by a generally tube-shaped annular core (13) made of a highly permeable material and surrounding said electrode-wire (12) in said stretch of said wire path between the said first and said second electrode carrier-rolls.

18. A welding-machine according to claim 12, comprising a common cooling-device (7) serving for cooling said electrode-wire in both said stretches of said path.

19. A welding-machine according to claim 16, wherein said cooling-drum (7) has a plurality of axial drum sections electrically insulated from one another, said guide grooves are formed in separate ones of said sections.

20. A welding-machine according to claim 17, characterized in that said annular core (13) surrounds said electrode-wire (12) in a stretch of its path lying between the said cooling-device (7) and the second (15) electrode carrier-roll.

21. A welding-machine according to claim 12, further comprising a drive (16) for said second (15) electrode carrier-roll and means (17/18) on said electride wire path for restraining said electrode-wire (12) to produce a wire-tension therein prior to said first (14) electrode carrier-roll.

* * * * *